ELECTROSTATIC PAGE PRINTER

Filed May 18, 1959

2 Sheets-Sheet 1

INVENTORS.
ROBERT V.D. CAMPBELL
HERMAN EPSTEIN

BY Ralzemond B. Parker

ATTORNEY

INVENTORS.
ROBERT V.D. CAMPBELL
HERMAN EPSTEIN
BY Ralzemond B. Parker
ATTORNEY

United States Patent Office 3,076,393

Patented Feb. 5, 1963

3,076,393
ELECTROSTATIC PAGE PRINTER

Robert V. D. Campbell, Drexel Hill, and Herman Epstein, West Chester, Pa., assignors to Burroughs Corporation, Detroit, Mich., a corporation of Michigan Filed May 18, 1959, Ser. No. 814,055
6 Claims. (Cl. 95—4.5)

This invention relates to electrostatic printing apparatus and particularly to page printers adapted, although not necessarily limited, to the printing of a line of text at a time.

Various printing and duplicating techniques are known which involve the production, on a suitable medium, of latent electrostatic images of the material to be printed or reproduced and the subsequent application of dry inking powder to the medium to render visible or develop this image through the adherence of the powder to the medium over the charged areas. Such techniques for the production of the electrostatic image directly from electrical pulses, termed "electrographic" printing, have been disclosed in earlier filed patent applications assigned to the present assignee including the application for patent of H. Epstein and F. Innes, Serial No. 443,646, filed July 15, 1954, now Patent No. 3,012,839

The present invention employs electrostatic techniques in a printing process wherein a record is first produced comprising latent electrostatic images of the characters of the text printed serially in a longitudinal direction on a continuous elongated light-permeable member or translucent tape. After this initial record is inked with a suitable powder to render the characters visible and opaque, the ultimate record is made on a medium preferably of page width and at a line at a time, by reproducing successive portions of the tape record.

It is an important object of the invention to provide improved electrostatic printing apparatus for printing text in page form, a line at a time.

Another important object is to provide improved means for transforming a textual record printed as a longitudinally extending series of characters on a continuous strip, into a multi-line page record.

Another important object is to provide means for printing an entire text in serial character-by-character format by means of suitably encoded electrical pulses and reproducing therefrom the same text in multi-line format, without the use of type or other mechanically operable printing means.

Another important object is to provide improved means for producing printed copy in multi-line page form responsive to serially occurring groups of electrical impulses representative of the characters occurring therein.

Other objects, advantages and meritorious features of the invention will be apparent upon consideration of the following specification and of the appended drawings in which.

Figure 1:
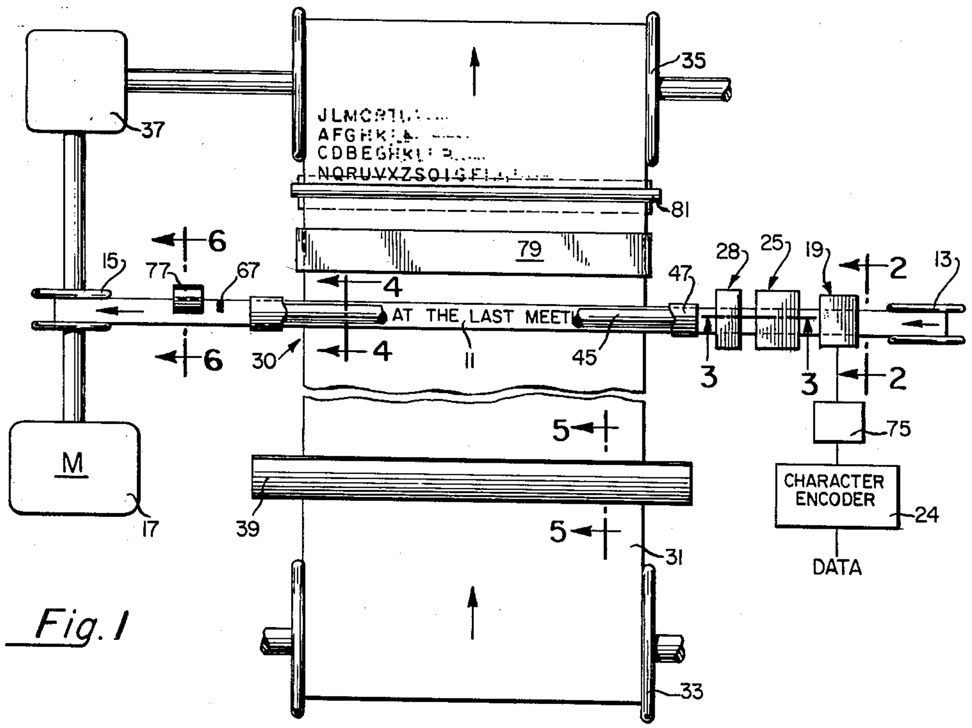
FIG. 1 is a schematic view illustrating one embodiment of the invention.

Referring now to FIG. 1, there is shown a transparent or translucent elongated record medium or tape 11, for example, polyethylene, arranged for transport between supply reel 13 and storage reel 15, the latter reel being driven from motor 17. As illustrated the driving arrangements provide for a continuous operative displacement of the tape in the direction indicated by an arrow. The tape, however, may be advanced in steps by employing additional intermittent motion means such as are disclosed, for example, in copending application for patent of E. Leshner, Serial No. 503,714, filed April 25, 1955 now Patent No. 2,858,131 which issued October 28, 1959, and assigned to the same assignee as the present application.

Figure 2:
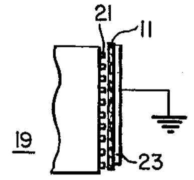
FIG. 2 is a cross-sectional view of the tape taken along line 2—2 of FIG. 1.

Upon leaving supply reel 13, tape 11 passes a printing station 19, shown in FIG. 2 as comprising a plurality of pin electrodes 21 and a common electrode or anvil 23, respectively positioned on opposite sides of the tape. The end discharge surfaces of the pin electrodes usually, but not necessarily, are spaced from the tape which has its opposite face in sliding contact with the anvil. The tape, either in an unmodified condition or when suitably treated, has a surface resistivity which makes it adaptable to retain an electrostatic charge. The excitation of pin electrodes 21 in suitable combinations and in suitable sequences is controlled by a character-encoding circuit, such as that represented at 24, to produce a pattern of dot-shaped charged areas of the tape surface collectively forming each character. The excitation potential of the pin electrodes relative to the potential of anvil 23 may be several hundred volts and may be applied to each electrode wholly in pulse form or as a combination of a steady bias and superimposed pulses.

Figure 3:
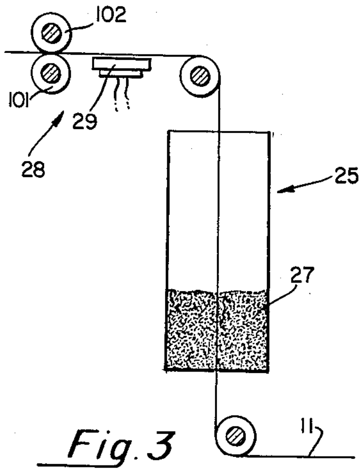
FIG. 3 is a sectional view taken longitudinally along the tape along line 3—3 of FIG. 1 and showing the indexing card fixing stations.

After being charged to produce the latent electrostatic image, tape 11 passes an inking and fixing station 25, shown in detail in FIG. 3, where a dry opaque inking powder 27 (FIG. 3) is applied to the tape surface to render the latent image visible through its retention in the charged image areas and where subsequently the visible image is fixed, at station 28, by heat from a heated element 29 followed by calendering by rolls 101 and 102, or by lacquering or other suitable means depending upon the character of the powder and of the tape surface. Details of the electrostatic printing process as well as a disclosure of a circuit for coding input electrical impulses in a suitable manner for character printing by the above described means are to be found in the aforementioned patent application Serial No. 443,646.

Figure 4:
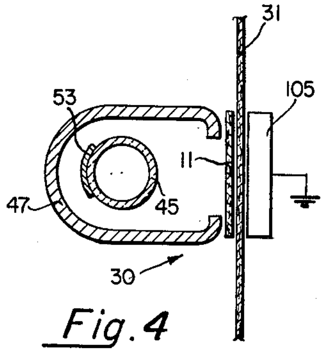
FIG. 4 is a cross section through the printing station taken along line 4—4 of FIG. 1.

After leaving station 28, tape 11 bearing an opaque image enters the printing station 30 and in close proximity to the surface of a second record medium as shown in FIG. 4. The second record medium is in the form of a continuous web 31 of paper, thermoplastic or other suitable material preferably having the width of a page of the ultimate copy. Web 31 is arranged for transportation perpendicularly to the direction of movement of tape 11 and in the direction of the arrow between supply reel 33 and a storage reel 35, the latter driven from motor 17 by way of bevel gears in gear box 37. This drive of both tape 11 and web 31 from a common source provides for the synchronization of the displacements of these two members.

The surface of web 31, adjacent to tape 11, is photoconductive, i.e., its conductivity varies with its exposure to light, this conductivity being a maximum with the highest degree of illumination. The printing process of the present invention is preferably carried out in a subdued ambient light so that the electrical resistance of the photoconductive surface of web 31 normally remains at a high value which permits the retention of an electrostatic charge.

Figure 5:
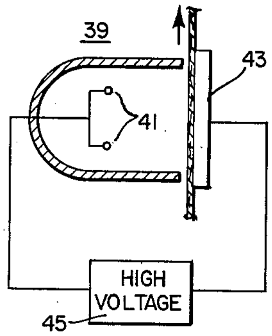
FIG. 5 is a detail cross sectional view taken along line 5—5 of FIG. 1 and showing the electrostatic charging station for the web record member.

Web 31 receives a substantially uniform electrostatic charge as it passes beneath charging means 39 (see in FIG. 5) comprising a pair of corona discharge wires 41 extending across the entire width of the web from which corona discharges to base electrode 43 are produced by a source 45 of high voltage, this being a conventional manner of charging a dielectric.

The charged web, after leaving charging means 39, enters the printing station 30 and arrives at the position defined by tape 11. As successive sections of the web arrive in the printing station an elongated source of illumination overlying the tape and extending across the width of the web is momentarily excited to produce a flash which illuminates a narrow zone of web 31 beneath tape 11 except for those areas which are masked by the opaque characters on tape 11. Preferably the light source is an elongated tubular gas discharge lamp 45 having a diameter approximately the width of the tape and a length approximately the width of the web. In FIG. 4 there is seen in an enlarged scale, the section of gas discharge tube 45 enclosed in a housing 47 which has an aperture defining the illuminated portion of tape 11. Tape 11 is backed at this point by grounded anvil 105.

Figure 7:
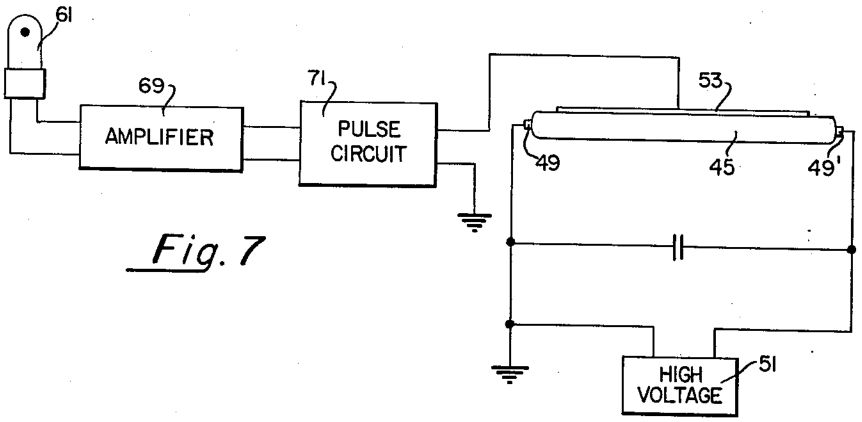
FIG. 7 is a diagrammatic view of the print control circuit.

Discharge tubes which can be luminously excited by short electrical pulses are known in the art, a circuit employing such a tube being shown in FIG. 7. Here tube 45 is seen as having end electrodes 49, 49', which are maintained at a potential just below the flashing point by connection to a high voltage source 51.

Figure 6:
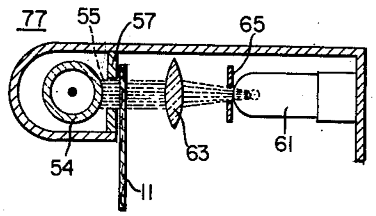
FIG. 6 is a detail sectional view taken along line 6—6 of FIG. 1 and showing the printing control station.

Tube 45 is also provided with an auxiliary electrode 53 extending longitudinally across a major portion of the tube which when suitably excited provides the additional potential gradient required to trigger the tube. The pulsing circuit comprises a source of illumination 54 which may be a standard type of concentrated filament electric light which may be arranged as shown in FIG. 6 to illuminate a marginal portion of tape 11 by means of an aperture 55 in a mask 57. This illuminated area is imaged on light sensitive photo tube 61 by means of an optical system shown as lens 63. A mask 65 may be provided to further restrict the beam which reaches tube 61. The means for controlling the flashing of tube 45 comprise opaque areas on tape 11, one of which is shown at 67 in FIG. 1. Each such area serves as a beginning-of-the-line marker on tape 11 and it is preferably printed electrostatically by means of three end pin electrodes 21 at printing station 19. When such a mark 67 momentarily interrupts the illumination of photo tube 61 a pulse is generated by amplifier 69 and pulse-forming circuit 71 which is suitable for triggering tube 45 upon its application to electrode 53.

Summarizing the operation of the apparatus above described, incoming electrical data representative of alphanumeric characters and the like is applied to character-encoding circuit 24 which furnishes the excitation of printing electrodes 21 in selected grouping and in selected time sequences suitable for producing latent electrostatic images of the characters sequentially on tape 11. These images are inked by an opaque ink at station 25 and may be rendered relatively permanent by heat fixing or otherwise at station 28.

Between each pair of sequences of characters of line length thus formed on the tape a beginning-of-the-line marker 67 is produced by excitation of three end electrodes of the printing means 19 by way of a timing or character-counting circuit 75 so that when this marker reaches printing control station 77, tube 45 is flashed and the resulting illumination dissipates the electrostatic charge on web 31 except where this illumination is masked by opaque characters on tape 11. There is thus produced a latent electrostatic image of a line of characters which travels with web 31 to an inking station 79 which may be similar to previously described printing station 19 where the characters are rendered visible by means of the application of an opaque ink powder or the like. Further advance of the web carries the latent images of each line of characters into a fixing station 81 where these images may be fixed in permanent form.

Figure 8:
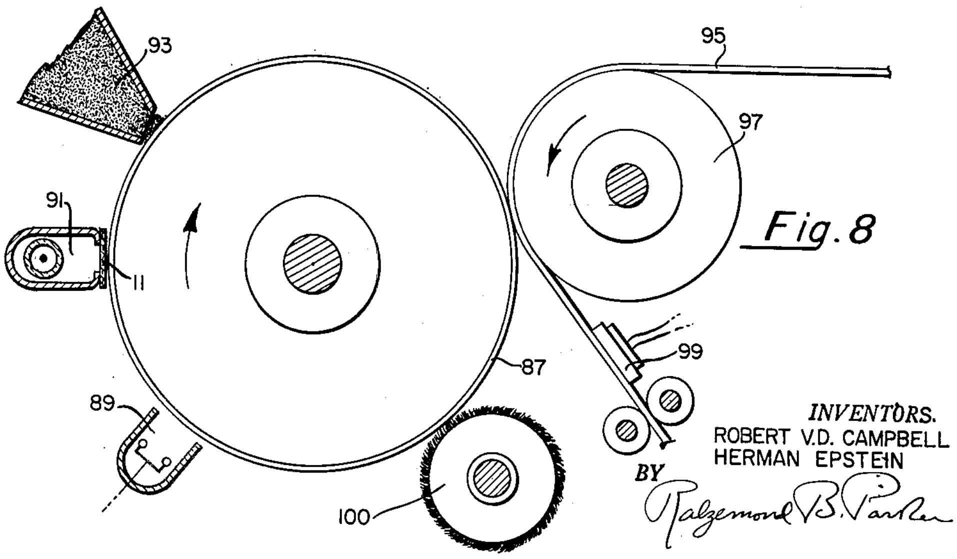
FIG. 8 is a schematic view illustrating another embodiment of the invention.

A modification of the arrangement of the parts of FIG. 1 is shown in FIG. 8 where instead of a continuous web 31 having a photoconductive surface there is provided an intermediate cylindrical photoconductive member from which images formed as described above are transferred to a web not having photoconductive properties. For example, a rotatably mounted electrically conductive grounded cylinder 85 may be provided, the exterior surface of which is rendered photoconductive by a suitable coating or which may mount a continuous photoconductive member 87 in sheet form around the periphery thereof. Member 87 receives a uniform electrostatic charge from corona discharge means 89 and this charge is modified at station 91 by the illumination of tape 11 produced by lamp 45, the tape being advanced parallel to the axis of the cylinder 85 and perpendicular to the direction of the movement of the member 87 thereon.

In the modification of FIG. 8, inking occurs at station 93 with a suitable powdered ink. A mass of ink is kept in contact with the moving member 87, and only the ink particles which are held by charges on 87 are carried up, against gravity, by the movement of 87. However, instead of being fixed by heat treatment or otherwise to the surface of photoconductive member 87, the powder is immediately transferred by pressure or by pressure added by electrostatic force (provided by means not shown) to a continuous web 95 passing over a portion of pressure roller 97 and bringing the web 95 into surface contact with the photoconductive surface of the cylinder 85 and the powdered image thereon. The transferred powder image on web 95 may be fixed by heat and calendering at fixing station 99 in the manner previously described. The surface of the cylinder 85 may be cleared by a brush 100 or other suitable means to prepare it for a subsequent printing-transfer operation.

What is claimed is:

1. Page printing apparatus comprising: an electrostatic strip printing and developing station for producing on a transparent charge-retentive dielectric tape of length much greater than its width opaque patterns representative of information; a store of photographically sensitive sheet record material of width much greater than the width of the said tape; tape advancing means for advancing the said tape past the said strip printing and developing station and therebeyond to extend along the width of the said sheet record material and in close proximity thereto; sheet advancing means controllably operable to advance the said sheet record material in a direction substantially at right angles to the direction of advance of the said tape; a controllable light source to project light through the transparent areas of the discrete portion of said tape which is in proximity to the said sheet record material upon the corresponding portion of the said sheet record material which is immediately adjacent to the said discrete portion of the said tape to produce upon the said sheet record material a latent photographic record of the patterns upon the said discrete portion of said tape; means for developing and rendering permanent the said latent photographic record on the said sheet record material; control means connected to control said tape advancing means, said sheet advancing means, and said light source to stop the advance of said tape when the said tape has advanced by a distance equal to the width of said sheet record material, then to cause said light source to operate, then to start the advance of said tape and to cause said sheet advancing means to advance said sheet record material by a distance approximately equal to the width of said tape.

2. Apparatus as claimed in claim 1, further particularly characterized by the fact that the therein said photographically sensitive sheet record material is an electrically charged photoconductive material, and the therein said means for developing and rendering permanent the said latent photographic record on the said sheet record material are adapted to develop and render permanent latent records consisting of electric charge patterns.

3. Page printing apparatus comprising, in combination: an electrostatic strip printing and developing station for producing on a transparent charge-retentive dielectric tape a line of opaque characters representative of information; means for presenting the said tape in position as a line of characters across a sheet-form photographically sensitive photoconductive record medium of page width; means for impressing the region of said sheet-form record medium which underlies said line of characters with electric charges; controllable means for photographing the said line of opaque characters as a latent image composed of said electric changes upon the said sheet-form record medium and for dissipating the remaining charges on said sheet-form record medium external to said latent image characters; means for advancing the said tape to present another length of the said tape, of page width, in the said position; means for advancing the said sheet-form record medium at right angles to the direction of advance of the said tape; and control means responsive to indicia on said tape for causing the operation of the said means for photographing when the said other length of the said tape has been presented as stated and the said sheet-form record medium has been advanced.

4. Electrostatic page printing apparatus for use with an overlay tape and with photographically sensitive photoconductive page means, said overlay tape being of translucent material and being capable of retaining electric charges, comprising: first station means for forming latent electrostatic images on said overlay tape; second station means for developing said latent images and rendering the same opaque to the transmission of light; a source of light to transmit light through the translucent areas of said overlay tape after opaque images have been developed thereon; means for depositing electric charges on said photographically sensitive photoconductive page means; first transport means to transport said photographically sensitive photoconductive page means in proximity to said light source; second transport means to transport said overlay tape through said first station, through said second station, and between said light source and said page means, said overlay tape being disposed substantially parallel to the plane of said page means and lengthwise substantially perpendicular thereto; and control means coupled to said light source and actuated by a substantially opaque region of said overlay tape to cause light to be transmitted through said overlay tape when it has been transported a selected distance along the width of said page means to effect a transfer of said images from said tape to said photographically sensitive photoconductive page means by dissipating certain of said electric charges that define said images.

5. Electrostatic page printing apparatus for use with an overlay tape and with photographically sensitive photoconductive page means, said overlay tape being of translucent material and being capable of retaining electric charges, comprising: first station means for forming latent electrostatic images on said overlay tape; second station means for developing said latent images and rendering the same opaque to the transmission of light; third station means including a source of light to transmit light through the translucent areas of said overlay tape after opaque images have been developed thereon, said third station means further including means to guide both (1) said photographically sensitive photoconductive page means therethrough and (2) said overlay tape therethrough so that said overlay tape is disposed both (1) between said light source and said photographically sensitive photoconductive page means and (2) substantially parallel to the plane of said photographically sensitive photoconductive page means and lengthwise substantially perpendicular thereto; first transport means to transport said overlay tape through said first, second and third stations; second transport means to transport said photographically sensitive photoconductive page means through said third station; means anterior to said source of light and adjacent to the path of movement of said photographically sensitive photoconductive page means for impressing the latter with electric charges; and control means coupled to said light source and responsive to a substantially opaque region of said overlay tape to cause light to be transmitted through the translucent areas of said overlay tape when it has been transported a selected distance along the width of said photographically sensitive photoconductive page means to effect a transfer of said images from said tape to said photographically sensitive photoconductive page means.

6. Electrostatic page printing device comprising: an overlay tape being of translucent material and being capable of retaining electric charges; page means in sheet form being of photoconductive material and having an outer surface; first station means for forming latent electrostatic images on said overlay tape; second station means for developing said latent images and rendering the same opaque to the transmission of light; third station means for providing an electrostatic charge along the width of said outer surface of said page means; light source means to transmit light through the translucent areas of said overlay tape after opaque images have been formed thereon; first transport means to transport said photoconductivep age means through said third station and in proximity to said light source; second transport means to transport said overlay tape through said first and said second stations and subsequently between said light source and said photoconductive page means; means for characterizing spaced-apart regions of said overlay tape, each representative of a line of printing on said photoconductive page means; control means coupled to said light source and triggered by a said characterized spaced-apart region to cause light to be transmitted through the translucent areas of said overlay tape when it has been transported a selected distance along the width of said page means thereby effecting a transfer of said images from said tape to said page means by causing the electrostatic charge on said page means to become partially and selectively neutralized in accordance with the light transmitted thereto; and image developing means to develop the unneutralized electrostatically charged areas on said page means.

References Cited in the file of this patent

UNITED STATES PATENTS

| | | |
|---|---|---|
| 1,808,123 | Uher | June 2, 1931 |
| 1,968,287 | Farina | July 31, 1934 |
| 2,108,767 | Fitzgerald | Feb. 15, 1938 |
| 2,726,940 | Buhler | Dec. 13, 1955 |

FOREIGN PATENTS

| | | |
|---|---|---|
| 734,909 | Great Britain | Aug. 10, 1955 |